J. E. B. WITH.
FASTENING DEVICE FOR WALL BOARDS.
APPLICATION FILED FEB. 21, 1917.
1,297,523.                         Patented Mar. 18, 1919.
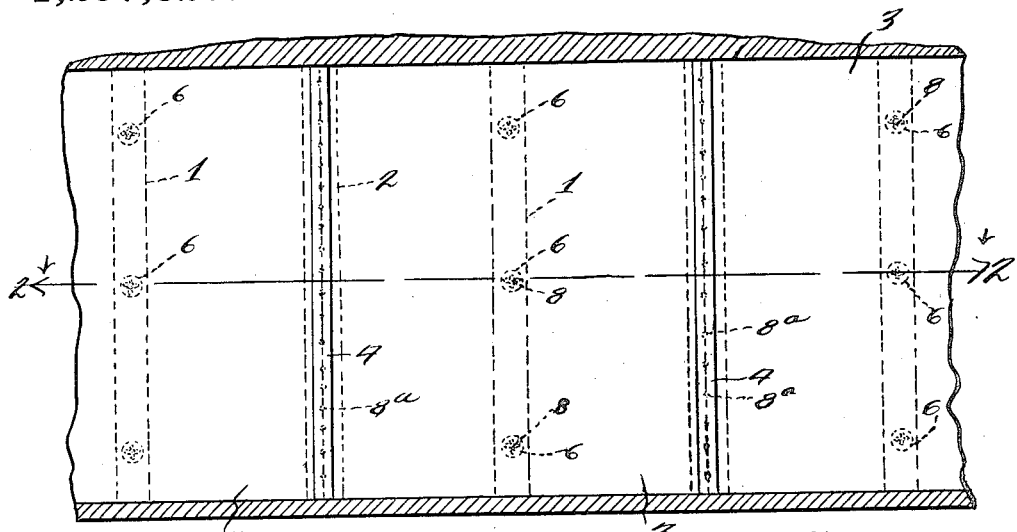
Fig. 1.
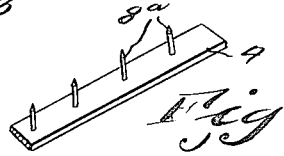
Fig. 6.
Fig. 2.
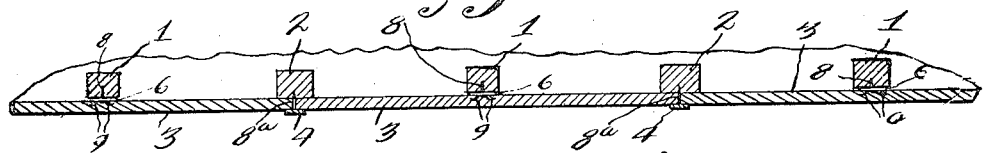
Fig. 5.        Fig. 3.
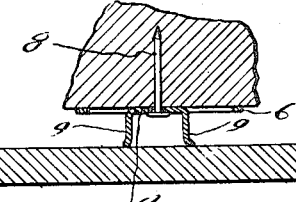
Fig. 8.    Fig. 4.
Fig. 7.
Inventor
J. E. B. With
By D. Swift & Co.
Attorney
Witnesses

UNITED STATES PATENT OFFICE.

JULIUS E. B. WITH, OF PORT TOWNSEND, WASHINGTON, ASSIGNOR OF ONE-HALF TO SAMUEL V. PEACH, OF PORT TOWNSEND, WASHINGTON.

FASTENING DEVICE FOR WALL-BOARDS.

1,297,523.  Specification of Letters Patent.  Patented Mar. 18, 1919.

Application filed February 21, 1917. Serial No. 150,137.

*To all whom it may concern:*

Be it known that I, JULIUS E. B. WITH, a citizen of the United States, residing at Port Townsend, in the county of Jefferson, State of Washington, have invented a new and useful Fastening Device for Wall-Boards; and I do hereby declare the following to be a full, clear, and exact description of the invention, such as will enable others skilled in the art to which it appertains to make and use the same.

This invention relates to an improved fastening device for wall boards and the like.

The aim of this invention is to provide means resembling the outer face of the wall boards, and designed to fasten the adjacent end edges of the boards to one of the vertical studs of a side wall.

A further object of the invention is to provide blind fastening devices, to be secured to the studs intermediate the first studs and provided with flexible pointed tongues or prongs extending in opposite directions to embed or pierce the wall boards partially to further secure the boards to the studs.

In practical fields, the details of construction may necessitate alterations falling within the scope of what is claimed.

The invention comprises further features and combination of parts, as hereinafter set forth, shown in the drawings and claimed.

In the drawings:—

Figure 1 is a view in elevation, showing the means for fastening wall boards to vertical studs of a side wall.

Fig. 2 is a cross sectional view on line 2—2 of Fig. 1, showing the two means of fastening.

Fig. 3 is an enlarged detail sectional view showing the first step in applying the blind fastener.

Fig. 4 is an enlarged detail sectional view, showing the final positions of the securing tongues or prongs of said blind fastener.

Fig. 5 is a detail perspective view of the blind fastening device.

Fig. 6 is a detail view of the means for fastening the adjacent ends of two wall boards to a stud.

Fig. 7 is a detail view in elevation of a fastener for securing wall boards, where they come together to form a corner.

Fig. 8 is a sectional view showing how two wall boards are secured to form a corner.

Referring more especially to the drawings, 1 and 2 designate vertical studs of a side wall and 3 denotes the wall boards. In order to fasten the adjacent end edges of two wall boards to the stud 2, a suitable elongated strip 4 is arranged to overlap said boards. The inner face of the strip is provided with suitable fastening devices 8ª, which pass between the adjacent end edges of said boards and pierce or embed into the stud 3, in order to hold the boards firmly in position. The outer face of each strip 4 may be suitably figured or designed in conformity with the outer face of the wall boards, in order to provide a substantially uniform appearance.

The body portions of the wall boards are secured to the intermediate studs 1, by means of blind fastening devices 6. Each blind fastening device comprises substantially a circular disk having a central slot 7 for the reception of a nail or the like 8, which is driven into the stud, to hold the disk 6 securely. Suitable tapering tongues or prongs 9 are struck up from each disk and are extended in opposite directions and curved partially outwardly, as shown clearly in Figs. 3 and 5. Each disk is first fastened to its stud by means of the nail or the like 8, and the tongues or prongs 9 are first disposed, as shown in Fig. 3, or substantially as shown in Fig. 5. The wall board is then arranged adjacent the extremities of said tongues or prongs, as shown in Fig. 3, after which suitable pressure or blows from a hammer or the like are imparted to the board, thereby causing the prongs to embed or pierce in opposite directions into the board. This is easily accomplished by reason of the fact that the wall boards are constructed of any suitable soft or fibrous material. The prongs or tongues in embedding or piercing the boards are so deflected as to form curves in the prongs, as shown in Fig. 4, in order to more securely hold the boards in place.

By provision of the elongated slot 7, the wall boards are allowed to expand and contract.

In Figs. 7 and 8, there is a fastener illustrated for securing two wall boards to form a corner. This fastener 14 consists of a strip of metal bent upon itself, as at 15, to form the two tongues 16, and the metal or that portion of the strip, as shown at 17, connecting the two tongues is bent, so that the two tongues may extend at right angles to each other. The portions of the strip beyond the two tongues are bent at 18 to form the parts 19, which are bent at 20, and the portions 21 beyond the bends 20 are arranged between two right angle extending wall boards 3, and the portions of two adjacent studs 22, there being nails or the like 23 extending through and securing the portions 21 to the studs, so that the two wall boards will fit between the tongues and the portions 21, shown in Fig. 8 clearly The invention having been set forth, what is claimed as new and useful is:—

1. A blind fastener for wall boards to be placed between the wall board and the stud to which the wall board is to be fastened, consisting of a thin, flat, metal plate having an opening therein to receive a fastening means to secure the plate to a stud and provided on the side toward the wall board with struck up prongs having pointed ends and so bent that they will enter the wall board and spread laterally to engage and retain it when the wall board is forced against the fastener.

2. A blind fastener for wall boards, comprising a metallic sheet metal disk having a substantially central elongated slot, for the reception of a fastening device to hold the disk to a stud, said disk having substantially diametrically disposed struck-up prongs, said prongs where they are integrally connected to the disk being substantially spaced, one prong on each side of the elongated slot, thereby providing space accessible for the formation of the slot, said prongs being at right angles to the slot and curved outwardly and laterally in opposite directions, whereby said prongs may pierce a wall board and become curved, so as to hold the board secured.

In testimony whereof I have signed my name to this specification in the presence of two subscribing witnesses.

JULIUS E. B. WITH.

Witnesses:
S. V. PEACH,
N. A. KLASELL.